Sept. 20, 1955   B. F. LYOT   2,718,170
SLITLESS SPECTROPHOTOMETER
Filed June 6, 1951   5 Sheets-Sheet 1
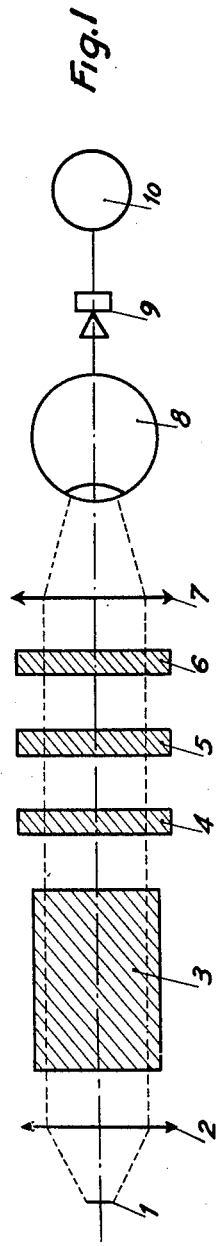
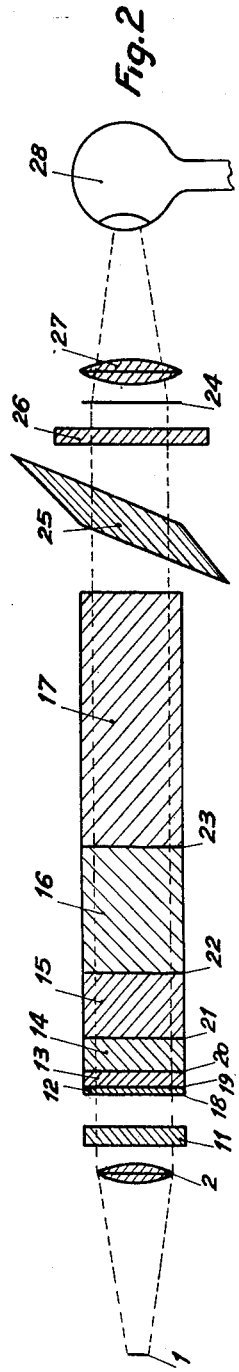
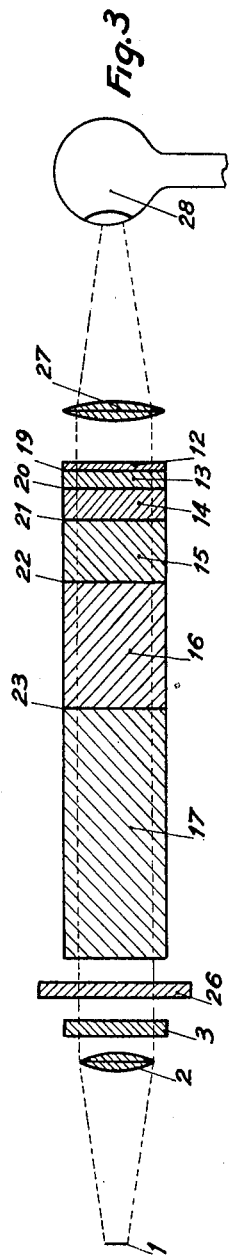
INVENTOR
BERNARD FERDINAND LYOT
BY Robert E. Burns
ATTORNEY

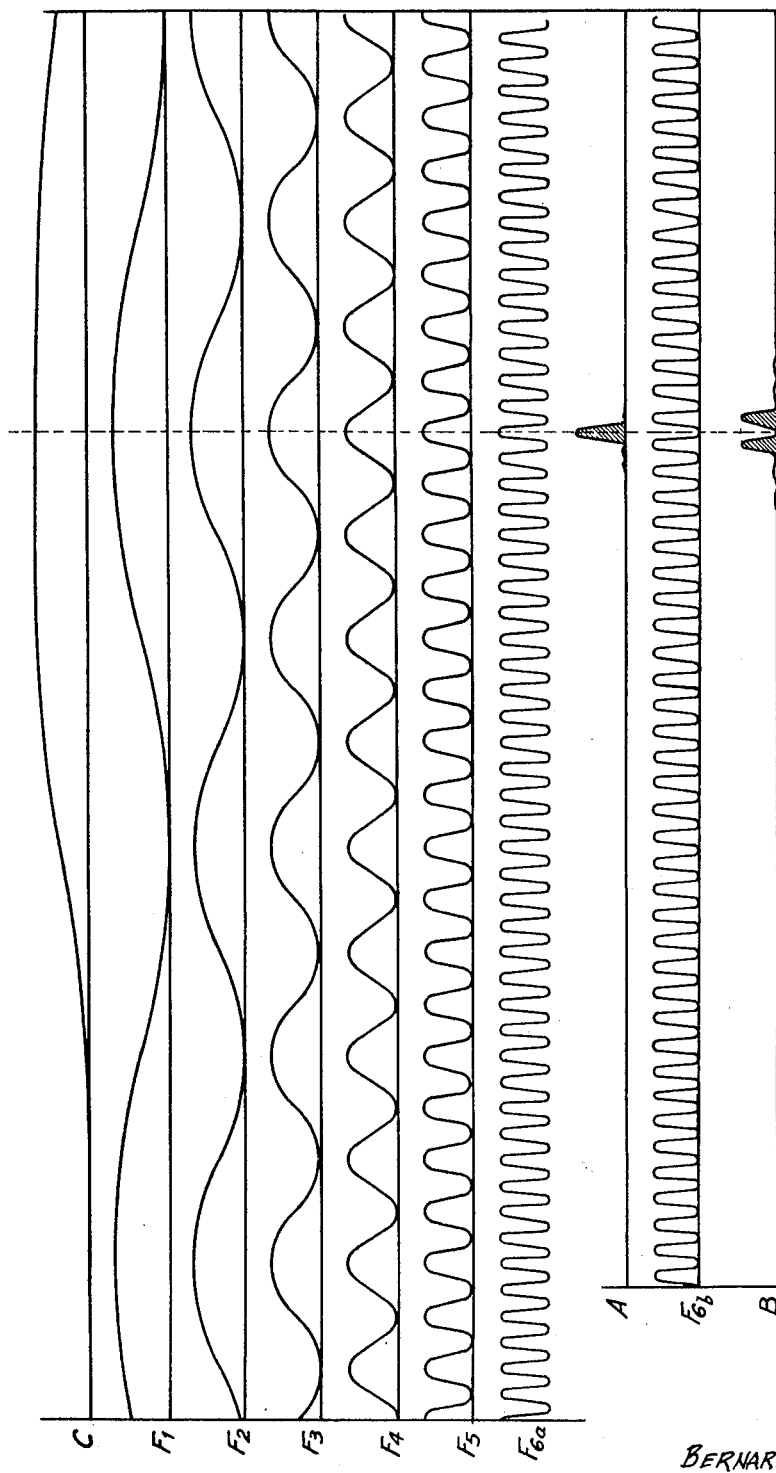

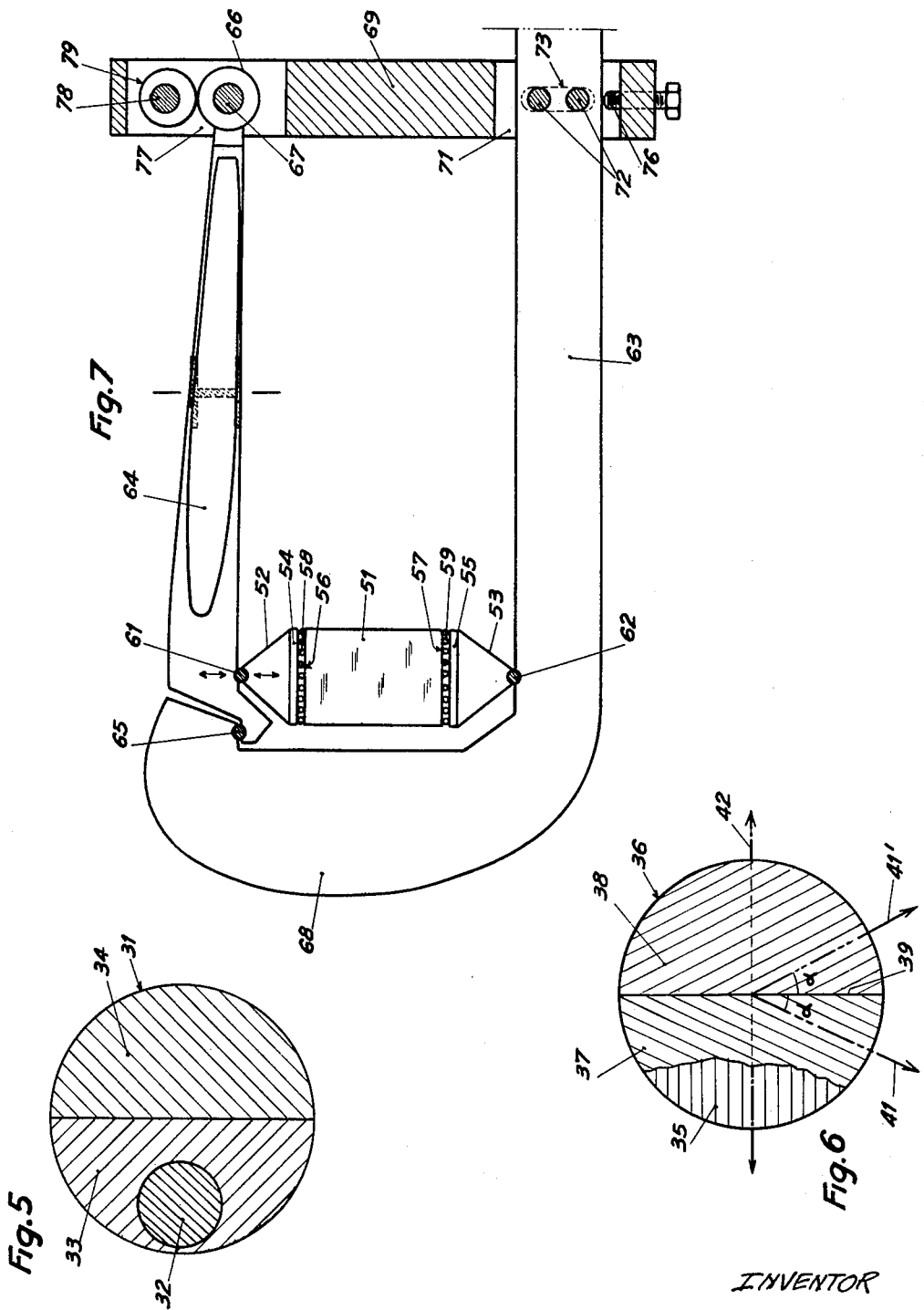

Sept. 20, 1955  B. F. LYOT  2,718,170
SLITLESS SPECTROPHOTOMETER
Filed June 6, 1951  5 Sheets-Sheet 4
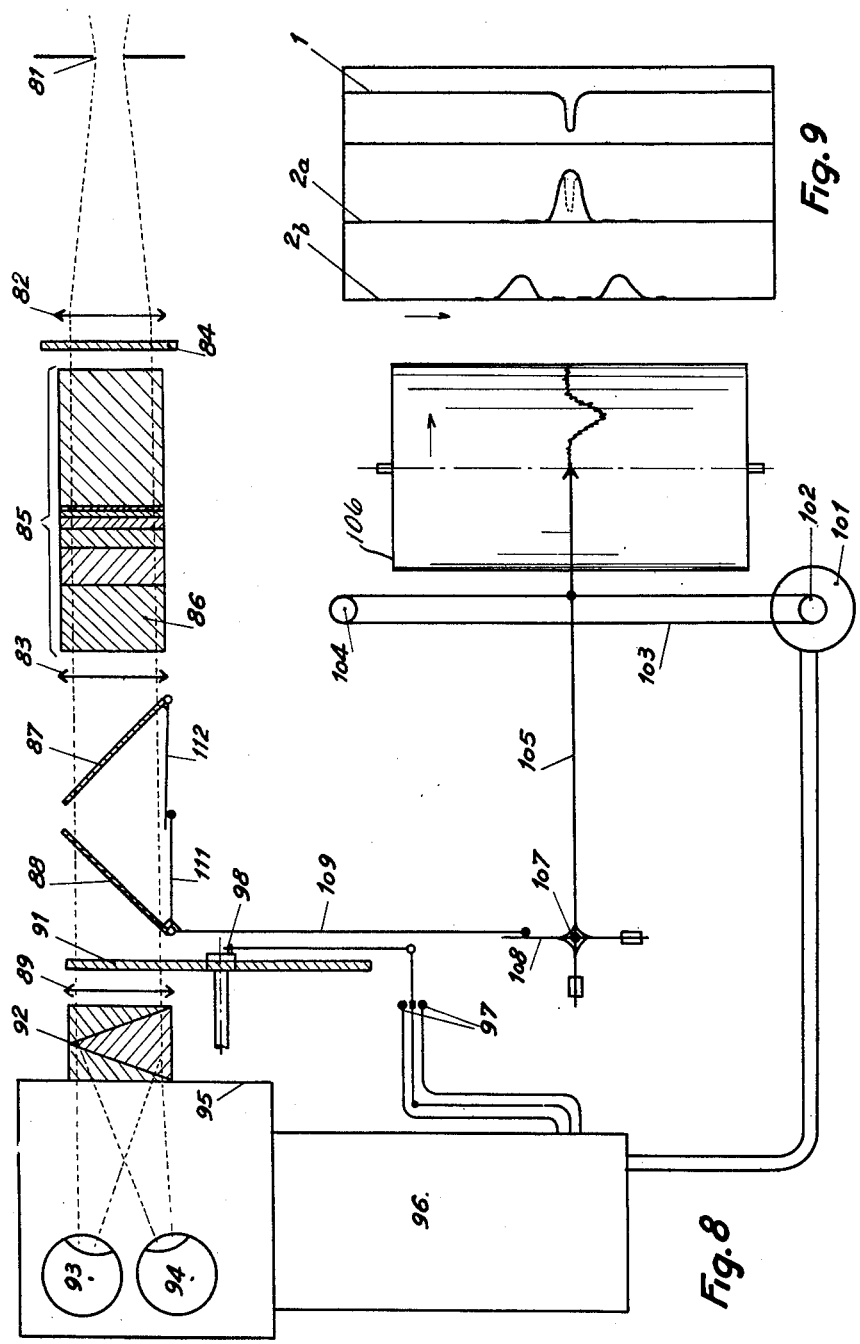
INVENTOR
BERNARD FERDINAND LYOT
BY Robert E. Burns
ATTORNEY

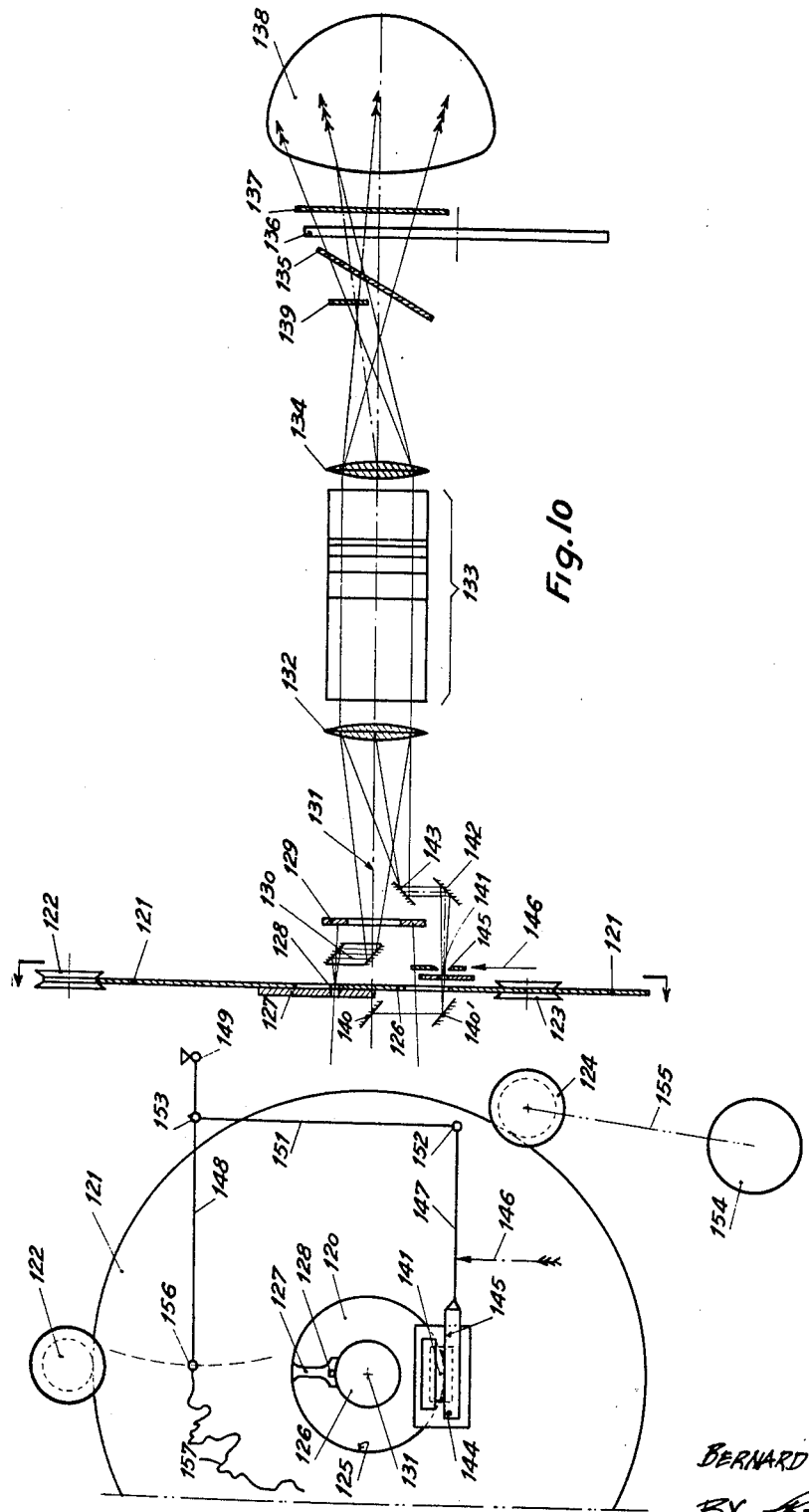

United States Patent Office 2,718,170
Patented Sept. 20, 1955

2,718,170

SLITLESS SPECTROPHOTOMETER

Bernard Ferdinand Lyot, Paris, France

Application June 6, 1951, Serial No. 230,133

Claims priority, application France June 13, 1950

10 Claims. (Cl. 88—14)

This invention has for object to provide an apparatus that permits to accurately measure, on the one hand, the intensity of a monochromatic radiation emitted or absorbed for instance, by a gas and, on the other hand, variations in its wave length.

These variations may be produced by various causes: a displacement of the gas along the line of sight (Doppler-Fizeau effect), a magnetic field acting upon this gas (Zeeman effect); and so forth.

This apparatus remains applicable and has a satisfactory sensitiveness when the monochromatic radiation under consideration is very small, when it appears, on a spectrum, in the form of a large or diffuse band, even a dissymmetrical one, or even when it is blended with a white light sufficiently intensive to render it indiscernible by ordinary means.

The apparatus according to the present invention is a slitless spectrophotometer constituted by disposing, in the path of the light beam emitted by the source of light under observation and concentrated by usual means, a narrow band chromatic filter, a polarizer, a fixed birefringent plate having for its object the transmission of two complementary channeled spectra polarized in two rectangular directions, a compensating device modifying the intensity ratio of these two components and a "modulator" followed by a polarizer alternately transmitting each one of these components to a photo-electric cell, the other component being then stopped or collected by a second cell, means for adding and amplifying the alternating currents produced in these cells feeding a rectifier of these currents and a receiver of the rectified current utilized for the purpose of reading or moving the aforesaid compensating device until this current is annuled.

The invention will be more clearly understood by referring to the accompanying drawings which show, by way of non-limiting examples, some embodiments thereof and in which:

Fig. 1 is a simplified diagram of the apparatus according to the invention;

Fig. 2 is a similar diagram comprising, as monochromatic filter, a polarizing monochromatic filter some elements of which are shifted to play the role of a birefringent plate and of a polarizer, the diagram stopping at the cell;

Fig. 3 is a diagram of a further embodiment comprising a monochromatic filter of the same type, inverted the modulator preceding this filter and the diagram being also limited to the cell;

Fig. 4 illustrates the intensity of the light transmitted in function of the frequency of the light vibrations by the first element, the colour filter and by each of the 6 layers of the polarizing monochromatic filter and further by the whole apparatus disposed as in Fig. 2;

Fig. 5 shows a revolving modulator utilizable in the embodiments of the invention;

Fig. 6 is a modified form of revolving modulator;

Fig. 7 shows, in a simplified form, a modulator particularly suitable for use in the apparatus of the invention;

Fig. 8 shows, by way of example, the simplified drawing of an embodiment of the invention particularly suitable for automatically measuring variations in intensity of the line Hα of the solar chromosphere;

Fig. 9 illustrates the intensity of the solar light in function of the frequency of light variations, in proximity to the line Hα, and the alterations imposed by this line on the transmitted radiations;

Fig. 10 shows, by way of example, the diagram of an embodiment of the invention particularly suitable for automatically measuring the intensity of the coronal lines; and Fig. 11 is a partial front view corresponding to the longitudinal disposition schematically shown in Fig. 10.

In Fig. 1, which illustrates the principle of the invention, 1 is a source of light that emits a continuous spectrum and some monochromatic radiations. The property of emitting a particularly intense light for certain rays and at the same time a continuous spectrum of lesser intensity, which is superposed at points of maximum emission, is peculiar to various sources of light. Mercury and hydrogen lamps are in this category. A collector 2, whose use is optional, renders parallel the light rays passing across, and these rays are directed through a monochromatic filter 3 and traverse a fixed birefringent plate 4. The latter transmits two complementary channeled spectra polarized at right angle. The light traverses a compensator 5, passes through a device 6 alternately transmitting the two polarized components of the light, then, the beam of light is concentrated by a lens 7, onto a photoelectric cell 8.

After passage through an amplifier (not shown), the electric current produced is rectified by the rectifier 9 and utilized, in the receiver 10 for the purpose of reading, recording, compensating or the like.

In Fig. 2 the source of light 1 yields, through the collimation lens 2, a beam of light that traverses a first colour filter 11 letting pass a wide band of the spectrum (curve C of Fig. 4) and followed by a narrow band monochromatic filter which, in this example, is a monochromatic filter of the type described, under the name of polarizing monochromatic filter, by the applicant, in 1922 in the C. R. of the Academie des Sciences, volume 197, pages 1593, 1594 and 1595, and in 1944, in a more detailed manner, in the Annales d'Astrophysique, volume 7, pamphlets 1 of January 1944 and 2 of April 1944, pages 31 to 79.

Such a filter is constituted, for example, by birefringent elements 12, 13, 14, 15, 16, 17 the thicknesses of which increase in geometrical progression whose ratio $=2$. These elements are made of quartz and have their faces parallel, to each other normal to the light rays, and their optical axes are parallel to one another and form 45° angles with the plane of polarization of the polarizers 18, 19 . . . 23 and 24 which are for example Polaroid or any other polarizing devices.

The last polarizer 24 can be incorporated in the element 27 but is shown separately therefrom.

In this apparatus, the first filter 11 and the ensemble of birefringent elements as well as the whole of polarizers 18 to 23 inclusive, constitute the equivalent of the narrow band chromatic filter 3 of the diagram of Fig. 1; the thick birefringent element 17 performs the role of the fixed plate 4 of Fig. 1.

Between the outlet of element 17 and the polarizer 24 there are disposed at least one parallelly faced inclined glass plate 25 and a modulator 26 constituted as will be explained later.

The beam of light is concentrated, from the outlet of the polarizer 24, by a converging lens 27, upon a photoelectric cell 28.

The operational principle of the apparatus of Fig. 2 will be made clear by means of the curves shown in Fig. 4 wherein the frequencies of light vibrations are taken as abscissae and the light intensities as coordinates above a horizontal reference line affected to each of the curves shown as being staged above one another without shifting the abscissae.

The curve C corresponds to the spread filtration of the coloured filter 11; the curves $F_1$, $F_2$ ... $F_5$ correspond to the first five birefrangible elements 12 to 16 between two polarizers of the monochromatic filter and $F_{6a}$ to the channeled spectrum of the last birefringent element 17.

As is known, the monochromatic filter thus constituted transmits a narrow band of the spectrum, surrounded with secondary maxima that become smaller and smaller. In a known manner it is possible, by changing the temperature of the monochromatic filter, to cause the center of the transmitted band (curve A) to coincide with the monochromatic radiation whose intensity we want to measure.

If the analyzer 24 rotates through 90° in its plane, the channeled spectrum $F_{6a}$ is shifted as shown at $F_{6b}$ and, instead of the maximum of the curve A, there are, surrounding the filtered frequency, two maxima somewhat smaller on co-ordinates, surrounding a zero and surrounded with some negligible secondary maxima (curve B).

The curves at peaks corresponding to the maximum in A and to the two maxima in B have substantially the same area because the transmission of the coloured filter and the sensitiveness of the photo-electric cell change slowly and regularly in function of the wave length or of the frequency. The continuous spectrum band of the source transmitted through the filter produces, in the cell, the same electric current for the two rectangular positions of the analyzer 24.

On the contrary, for the flux of the monochromatic radiation coinciding with the maximum of A there is a fall to zero at B.

If the analyzer 24 is caused to rotate in its plane, the cell will receive a continuous flux corresponding to the continuous spectrum surrounding the line, and a discontinuous flux with maximum and minimum corresponding to shifts through 90° of this rotation.

The cell will translate the received fluxes into a direct current and into an alternating-current of frequency twice as great as the number of revolutions per second of the polarizer.

It is easy to separate these two currents, amplify the alternating-current, rectify the latter with a detector and measure the same, with a micro-ammeter.

It is also possible, as it is shown in Fig. 2, to modify the intensity ratio of the two spectra and thereby nullify the alternating current produced by the cell 28, by placing after the last crystalline element 17, one or several orientable inclined glasses 25. The inclined glass or glasses 25, by partially polarizing the light, weaken unevenly the two components which are partially polarized at an angle of 90° and thus make it possible to render these two components equal after they have gone through said glass or glasses 25. The alternating current produced by the cell 28 is thus made zero.

If $f_1$ is the flux of the continuous spectrum and $f_2$ the flux of the monochromatic radiation, then the ratio of the components leaving the last element parallelly and perpendicularly to the vibration transmitted by the polarizer 23 is:

$$(f_1+f_2)/f_1$$

If $f_2$ is positive (emission line), the plane of incidence of these glasses will be placed normally to the vibrations transmitted by the polarizer 23.

If $f_2$ is negative (absorption line), the plane of incidence will be placed parallel to the vibrations transmitted by 23.

The required inclination of the glasses 25 for rendering the two components equal can be calculated from the classical Fresnel's formulae:

$$r_n = \left[\frac{\sin(i-r)}{\sin(i+r)}\right]^2$$

$$r_p = \left[\frac{\operatorname{tg}(i-r)}{\operatorname{tg}(i+r)}\right]^2$$

Conversely, the inclination of the glass elements producing zero current can be used to measure the corresponding changes in wave length of the light being analyzed.

If the line of emission or of absorption is not sufficiently thin it will be necessary to take into account its width and, if needed its profile.

Up to now it has been supposed, in conformity with the diagram of Fig. 1, that in the apparatus of Fig. 2, the role of alternate polarizer was performed, as known, by the rotation of a polarizer 24.

In reality, a great characteristic improvement of the invention is to replace the variation in polarization, due to the rotation of the sole polarizing analyzer 24, by the combination of a stationary polarizing analyzer 24 with a modulator 26 interposed into the light beam that gives a rectangular modulation. The combination of these two members in accordance with the invention renders possible a rectangular modulation which multiplies by $\pi/2$ the output and increases the contrast.

The defects resulting from the absence of such a member are, in fact, as follows:

A photo-electric cell, such as 28, has in general a sensitiveness that varies with the orientation of the incident polarized vibration, producing a disturbing modulation of the continuous spectrum.

The modulation of the monochromatic light produced by the rotation of polarizer 24 varies the light in function of time, according to a sine law; the rectified current is inferior to that given by a rectangular modulation in the ratio $2/\pi$; thus reducing the sensitivity of the process.

In the apparatus according to the invention the polarizing analyzer 24 is left stationary, so as to avoid the modulation due to a varying orientation of the incident polarized vibration onto the cell.

The device 24 is preceded by a rectangular modulator that suddenly changes, by 90°, the directions of the incident vibrations, at equal intervals.

Several devices may be utilized for carrying out such a "rectangular modulator."

As is schematically shown in Fig. 5, use may be made of a large turning disc 31 through the periphery of which passes the beam of light 32. This disc is composed of two halves 33, 34 made, respectively, of right-hand quartz and left-hand quartz, whose thicknesses are so adjusted as to cause the vibrations to rotate alternately through 45° in opposite directions, the polarizing analyzer 24 being itself rotated through 45° in its plane (in respect to the other polarizers 18, 19, 20 ... 23).

The right quartz and the left quartz may be replaced, respectively, by two superposed half-wave sheets whose optical axes form, between them, angles of 90°+22° 30' on the one half and 90°−22° 30' on the other half (Fig. 6). Such a modulator will be constituted by superposing two cellophane half-wave discs 35, 36 one of which, 36, has been cut into two parts 37, 38 along a diameter 39 forming an angle $\alpha$ of 22° 30' with its optical axis 41. The half 37 is placed on the disc 35, with the diameter 39 perpendicular to the optical axis 42 of 25, and the half 38 joined to the former along the diameter 39 after its face has been inverted, whereby its axis is brought to $41^1$ forming the angle $\alpha = 22°$ 30' symmetrical to 41 with respect to 39.

These two discs, thus oriented, are cemented between two glasses by means of optical cement.

This "rectangular modulator," of convenient use, gives very good results.

The modulator that appears to give the best results, is a glass plate with parallel faces, which is subjected to a uniform pressure, parallel to its plane and of a value such that the birefringence resulting therefrom is of half a wave length. This pressure, which depends on the wave length employed, is in the order of one hundred kilograms per square centimeter, for a plate one centimeter thick, and must be established or suppressed, suddenly and alternately, during equal times. This device is carried out as shown in Fig. 7.

A glass part 51, prismatic in shape and of rectangular section, whose optical faces are parallel to the paper of Fig. 7, is pressed between its bases by two parts 52, 53 made of steel and provided with bottoms 54, 55 of surfaces corresponding to those of these bases 56 and 57. Two networks of aluminum wires 58 and 59 are interposed between 54—56 and 55—57 and partly crushed so as to ensure the uniform pressure wanted.

The parts 52, 53 provided with cylindric rollers 61, 62 disposed perpendicularly to the optical faces and in a plane of symmetry of the prism 51, are compressed between a base 63 and a lever 64 pivoted on an axle 65 parallel to the rollers 61, 62 and carried by 63.

The lever 64 is, for example, of uniform strength and of double T-like shape, with minimum weight and maximum rigidity.

At its end opposed to 65 the lever 64 carries, parallel to 61—65, a cylindric roller 66, made of hard ground steel, revolving concentrically on an axis 67 rigidly carried by 64.

The leverages 61—65 and 61—67 have a convenient ratio to multiply the stresses acting upon 66.

The supporting base has, for example a portion thereof substantially horizontal 63 receiving 62 and a C-like portion 68 receiving the axis 65, as schematically shown in Fig. 7.

The horizontal portion 63 is fixedly mounted in an upright 69 of a rigid frame not shown.

The part 63 may slide in a vertical aperture 71 made in 69, and is vertically guided by two screws 72 which ensure its blockage and are movable in vertical apertures 73 made in the walls of aperture 71. The accurate adjustment is effected by a vertical screw 76 passing through the bottom of 69.

The end, provided with the roller 66, of the lever 64 is freely engaged into an upper aperture 77 made in the upright 69.

In this aperture 77 there is disposed, turning in bearings carried by 69, a shaft 78, parallel to 66, on which there is keyed, with convenient eccentricity, a circular cam forming roller 79 on which 66 is pressed, with adjustable force, by means of 76.

On the axis 78 of cam 79 are keyed a fly wheel and a motor-driven pulley, not shown.

This mechanism ensures, with a very small mechanical energy consumption, sudden compressions and depressions of the glass layer 51, at frequencies that may exceed 50 per second, without the total amplitude of the motions of the roller 66 exceeding 0.7 mm., and without the total effort of acceleration and compression, exerted on this roller, attaining 20 kilograms.

In order to obtain maximum luminous efficiency, the polarizer 24 of Fig. 2 may be replaced by a double refracting prism or by a calcite polarizer that transmits the polarized light in one direction and reflects the same in the rectangular direction. The two emergent beams of light are received each by a photo-electric cell. These two cells then produce alternating currents of opposed phases. In order that these currents may add their efforts, it is necessary to connect the cells inversely at the amplifier inlet or to add a device reversing the phase of one current for example a transformer or lamp whose amplification is reduced in proximity to the unit. This last device is necessary when the luminous flux is weak, for it is then necessary to employ electron-multiplying photocells. If the luminous flux is very weak, it is necessary to cool the cells to reduce their dark current.

The accuracy of the measurements is limited by the oscillations of the pointer of the micro-ammeter. Their mean amplitude is, all things being equal, proportional to the square root of the width of the band of frequencies transmitted by the amplifier. The accuracy may be greatly improved by narrowing this band, but one is limited, in this way, to about two periods, by the necessity of imparting to the frequency of the modulator a higher and higher constancy.

Much superior results are obtained by replacing the detector by a contact that rectifies the amplified current, in synchronism with the modulator whose speed then does not need to be constant. The amplifier then will be preferably non-selective and will transmit, without important deformation, the rectangular alternating-current. The width of the band of frequency employed is then no more determined by the amplifier, but by the time constant of the micro-ammeter; with usual apparatus, it is of a few tenths of period, and it may be reduced at will by increasing the inertia of micro-ammeter or, still better by substituting for it a fluxmeter or a counter that measures the quantity of electricity given by the rectifier during a determined time that may exceed one minute. The probable error due to fluctuations varies inversely to the square root of this time.

Another advantage of the synchronous rectifier is to impart a current proportional to the amplitude of the variations in light produced by the modulator and changing the direction when the phase of these variations is inversed.

The simultaneous employment of these improvements permits to increase the accuracy up to the limit that corresponds to the luminous flux, the sensitiveness of the cells and the time available, which limit is imposed by the discontinuous nature of the photoelectric current. This limit is, in general, very high, as will be seen in connection with some embodiments of the invention that will be described by way of example hereinafter.

(1) Application of the apparatus according to the invention for measuring variations in wave length:

Supposing that the filter temperature is adjusted so that the radiation studied coincides with the maximum of the curve A (Fig. 4), if this temperature is slowly varied for example in the increasing sense, the two curves A and B move towards the short waves. For the radiation under consideration, the transmission of the curve A decreases, while that of the curve B, which was zero, increases. The alternating-current produced by this line becomes zero and changes its sense when these two transmissions are equal.

With the temperature adjusted so that the current is zero, and maintained perfectly constant, the micro-ammeter rests at zero. If the wave-length comes to vary, the micro-ammeter shows a deviation proportional to this varation and to the line intensity.

In this case again it is advantageous to adjust the temperature so that the alternating current is maximum, then to nullify this current by varying the birefrangibility of the last filter layer: this will be followed by a compensator constituted for example by a glass plate, with parallel faces, whose cross-section is subjected to a uniform pressure, in a direction parallel or perpendicular to the optical axis of the crystalline layer. The amount of pressure nullifying the current is independent from the intensity of the radiation studied and from its eventual variations, and it provides the wavelength minus a constant value.

(2) Application of the apparatus according to the invention to measuring a magnetic field:

*First method.*—The source of light is supposed to be subjected to a magnetic field parallel to the direction of observation, when this source is observed spectroscopically, the line of emission or of absorption takes the form of two lines having the same intensity and being symmetrical with respect to its normal position and polarized circularly in the opposite directions (Zeeman normal effect); these two radiations have different wavelengths, and the difference is proportional to the magnetic field and it permits measuring the latter.

When the monochromatic filter is preceded by a quarter wave plate, this latter transforms the two circular vibrations into two rectangular rectilineal vibrations. When the plate is caused to rotate through 90° in its plane, the two vibrations rotate through the same angle and the first polarizer of the filter extinguishes at will one or the other.

Even if the magnetic field is too weak to separate completely these two radiations, the result is a variation in wave-length that may be measured by means of the preceding apparatus, either by the difference between the two readings on the micro-ammeter, or by the difference between the pressures of the compensator that nullify the current in the two cases. With the compensator, the results are independent from the intensity of the radiation.

*Second method.*—It is likewise possible to measure a magnetic field in a more direct way by modifying the disposition of the preceding apparatus:

The source 1 of Fig. 3 is followed by a lens 2 that forms of this source an image to infinity, then by the coloured filter 3, then by the compression modulator 26, then by the filter 17, 23, 16, 22 . . . 12, deprived of its last polarizer 24 and oriented in such a way that the light passes through the element 17, and then by a lens 27 that concentrates the rays upon the cell 28.

With the modulator 26 supposed to be first non-compressed, for a circular polarized radiation, the transmission of the element 17 is indicated by the curve $F_{6a}$ (Fig. 4) displaced through a quarter of the interval between two of its maxima, in one sense or in the other, according as the circular vibration is right or left, for example toward the short waves, that is, toward the right for the right circular, and toward the long waves, that is, toward the left for the left circular. In the absence of any magnetic field, these two circulars have exactly the same wave-length and the element 17 transmits 50% of each of them. If there is a magnetic field of the sense such that the wave-length of the right circular is diminished and that of the left circular is increased, the transmission of the two circulars is superior to 50%. If the plate of the modulator 26 is compressed to impart to it a birefrangibility of a quarter wave-length, the curve $F_{6a}$ is replaced by a complementary curve and the transmission is inferior to 50%. The transmission of the other layer elements, that passes through a maximum for the given extent, is practically unaltered by the magnetic field.

This apparatus has the advantage of being much less sensitive to temperature variations of the filter so that this temperature does not need, any more, to be adjusted with great accuracy. It is insensitive to monochromatic radiations, which are not polarized, and to radiations of the continuous spectrum.

In this case again it is advantageous to effect the measurements by nullifying the alternating current. For this purpose it is sufficient to partly polarize the light, prior to the modulator, parallelly or normally to the vibrations transmitted by the polarizers, by means of one or several inclined glasses. It is then possible to deduct the variation in wave-length, produced by the magnetic field, from the proportion of polarized light produced by the glasses, whatever the intensity of the monochromatic radiation.

It will be seen that the following modes of execution of the present invention, considered together with those already described, are particularly suitable for use, e. g., in astrophysics, geophysics, meteorology and metallurgy.

(1) Mode of execution of the invention for measuring the intensity of the solar line Hα:

The red line Hα, of wave-length 6563 Angstrom, is one of the stronger lines of the chromosphere of the sun. In a very dispersive spectroscope it appears in general, on the whole solar disc, as an absorption line large and deep-dark. Its width is about 1 Angstrom and its intensity 20% of that of the neighbouring regions of the continuous spectrum; its profile is shown by the curve 1 in Fig. 9. In some narrow regions, generally near the spots, sometimes appear "chromospheric flares," bright phenomena characterized by a strong increase in brightness of the line Hα which then can attain 300% of that of the continuous spectrum. These phenomena last from 15 minutes to several hours, according to their importance. They are subject to a constant observation by stations located at all the longitudes, for their appearance causes important disturbances in radio-electric communications and, on the other hand, they often permit to forecast magnetic storms. This observation is effected sometimes visually, sometimes cinematographically, with spectrohelioscope or with spectroheliograph. The visual observations are neither sufficiently continual nor sufficiently accurate, while cine-recording is costly, and studying the films is long .

The spectrophotometer without slit should allow to obtain automatic records indicating hours of eruptions, their duration, their global intensity at any time and further should allow to determine with certainty their importance and easily to compare them with dependent phenomena such as emissions of radio-electric waves by the sun and ionospheric disturbances.

Fig. 8 shown, by way of example, a slitless spectrophotometer according to the invention, intended for recording the intensity of the radiation Hα.

A lens not shown concentrates the solar light upon the diaphragm 81. A lens 82 forms an image of this diaphragm on the lens 83 through a red glass 84 and the polarizing monochromatic filter 85. This filter isolates a 3-Angstrom wide band (curve 2a, Fig. 9) which, owing to a convenient adjustment of the temperature, contains at its center the absorption band Hα shown by the curve 1. The last filter plate 86 is the second in thickness; the last polarizer being discarded. The filter is oriented about its axis in such a way that the vibrations proceeding therefrom are parallel to the plane of the paper in Fig. 8 and correspond to the curve 2a (Fig. 9) containing Hα. The perpendicular vibrations correspond to the curve 2b; they do not contain Hα and, consequently, are more intensive.

The equality is re-established by glasses 87, 88 equally but inversely inclined toward the axis of the beam of light. Owing to this arrangement, their action depends very little upon the direction of the rays passing therethrough.

The filter is followed by a lens 83 which forms the image of the lens 82 upon the lens 89; this periscopic disposition permits of concentrating the beam despite its length. The lens 89, preceded by the disc 91 of the modulator forms, in its turn, through the birefringent prism 92, two images of the lens 83, one upon the cell 93 and the other upon the cell 94, contained in a box 95. If the glasses 87, 88 are not conveniently inclined, the cells produce alternating currents that bring a low frequency amplifier 96, in action one through the grid of the first lamp whose amplification is reduced in proximity to the unit, and the other through the grid of the second lamp. The alternating currents, thus completing each other, are amplified, rectified by the double contact 97 moved by an eccentric pin 98 keyed, with a convenient phase, on the shaft 99 of modulation 89. After a new amplification, the rectified current feeds the motor of counter 101. This motor, conveniently geared, rotates the pulley 102 that moves the driving belt 103 strained by the pulley 104. The belt is attached to the pointer 105 of a chronometrically driven recording cylinder 106, and causes the pointer to pivot about its axle 107. The pointer 105 inscribes a trace upon a paper wound on the cylinder 106, while displacing, by means of a contactor 108, a lever 109 cooperating with a lever 111 which is contact with a lever 112 and modifies the angles of inclination of the two glasses 87, 88 rotated about axles 113, 114 until the alternating current is nullified.

The position of the pointer 105 is thus determined by the intensity of the line Hα compared to that of the neighbouring continuous spectrum; this position is independent from the transparence of the atmosphere and from its variations.

The trace inscribed by the pointer 105 upon 106, therefore, provides, at any instant, the desired intensity.

Flares produce a rectified current of the direction contrary to that of the permanent absorption line; this current corresponds to relative variations in the luminous flux which are in the order of 25 millionths for flares of importance I, 150 millionths for those of importance II, and 1,000 millionths for those of importance III. In view of the considerable flux of light available, fluctuations of the electron current will be much inferior to these values and will be invisible on the record.

The bright facular zones that surround the spots will produce a deviation, of the same sense as flares, and prominences at the edges, while prominences on the disc will produce an opposed deviation, but these phenomena will be easily distinguished from flares, by their very different, and generally very slow, evolution.

The recording must remain possible even through a cloudy sky; indeed, the brightness of a cloudy sky comes seldom below 0.1 candle per square centimeter. Through a wide field filter transmitting 10% of a light beam of $4/100$ of steradian and of 2.5 centimeters in diameter, in a band of 3 Angstrom, the luminous flux will be $$0.1.0.1.\frac{4}{100}\frac{(2.3)^2\pi}{4}\frac{3}{2,000}$$

that is: $2.5 \ 10^{-6}$ lumens. A slightly oxidized caesium-antimony on silver cell can yield, for this wave-length, a current of 6 micro-amperes per lumen; the number of electrons emitted will therefore be:

$$2.5 \ 10^{-6}.6 \ 10^{-6}.6.25 \ 10^{18} = 0.9310^{18}$$

per second, corresponding to relative fluctuations of $1.04 \ 10^{-4}$ in 1 second, and $0.3 \ 10^{-4}$ in 10 seconds. An eruption of mean importance II, which would produce a modulation of $1.5 \ 10^{-4}$, will begin distinguishing itself from fluctuations of the tracing in a time superior to 1 second; as its duration is in the order of a half-hour, it will be accurately recorded.

(2) Mode of execution of the invention for measuring the intensity of the emission lines of the corona, in proximity to the edge of the sun:

This measurement is of considerable practical interest because, according to the relations existing between the solar corona and the terrestrial ionosphere, it permits to predict the wave-lengths most favourable for radioelectric communications at various distances.

With the spectrograph, this measurement was only possible during rare total eclipses of the sun. Since some years, it is effected by means of spectrographs associated with coronagraphs, at a distance of 1–2 arc minutes from the sun edge, in 4 mountain observatories, whenever the air is sufficiently pure. The slitless spectrophotometer according to the invention permits to make this measurement anywhere and even in poor atmospheric conditions. Indeed, in plain the image of the sun, obtained by a chronograph is surrounded with a halo of light diffracted by dusk, whose brightness, at 1 or 2 minutes from the sun edge, attains, in average conditions, one thousandth of that of the sun, while the strongest coronal line, namely the green line 5303 Angstrom, has an intensity that varies from 1 to 300 millionths of that of 1 Angstrom of the continuous spectrum of sun and measures 0.8 Angstrom in width; in these conditions it is inobservable through the spectroscope.

Let us project for example, with a coronagraph having a useful opening of 1 square decimeter, the image of the sun upon a metallic screen pierced with a hole that isolates the light from a sky portion, of 1 minute in diameter, situated between 1 and 2 minutes from the sun edge.

The illumination, produced by the sun, being $10^5$ lux, the flux of solar light received by the coronagraph opening is about $10^5 \ 10^{-2} = 10^3$ lumens; if the image of the sun were formed by the hole, the latter would allow to pass the thousandth portion approximately, that is 1 lumen; when it is illuminated by the sky, it receives 1000 times less, that is $10^{-3}$ lumens. The aforesaid monochromatic filter transmits, in green, a 2-Angstrom-wide band in which is located approximately one thousandth of the luminous flux, that is $10^{-6}$ lumens; it lets pass one-tenth of the light, that is $10^{-7}$ lumens. The photocathode of a caesium antimony photo-electric cell, of mean sensitiveness, supplies $10^{-5}$ amperes per lumen; it provides, in these conditions, $10^{-12}.6.25 \ 10^{18} = 6.25 \ 10^6$ electrons per second. From one second to the other, this number of electrons undergoes relative fluctuations of $1 \ 6.25 \ 10^6$, that is $4 \ 10^{-4}$.

If the coronal line presents, at the point under consideration, an intensity equal only to 1 millionth of that of 1 Angstrom of the continuous spectrum of the sun (or 1 thousandth of that of 1 Angstrom of the continuous spectrum of the sky), it produces relative variation in the luminous flux of $$\frac{10^{-3}}{2} = 5 \ 10^{-4}$$

and the micro-ammeter shows a deviation superior to its oscillations due to electron fluctuations, if its period is superior to about 1 second.

Experiments teach that it is possible to meet pretty nearly these conditions of theoretical operation, by employing one or two electron multiplier cell or cells whose obscurity current is negligible in respect to that produced by the luminous flux of 0.1 microlumen.

The spectrophotometer thus permits to measure the intensity of the coronal green line, even when the latter is very feeble, in plain and in poor atmospheric conditions.

The solar lines next to the coronal line produce a rectified current; this current may be nullified once for all, by means of a glass whose inclination is adjusted in the absence of the coronal line, for example, by displacing the sun image so that the hole receives only the light of a sky portion outside the corona. When the latter projects itself again upon the hole, there appears a current due, this time, to the coronal line only, this current being proportional to the intensity of this radiation that may thus be measured by means of a standard. It is also possible to nullify this current by mixing, with the light proceeding from the filter, some solar light conveniently filtered, totally polarized and weakened in a known proportion, by a movable photometric wedge or a slot of varying width or two polarizers of which one may rotate. There is thus obtained directly the intensity of the coronal line as compared to the solar spectrum, without having to take into account variations in the atmospheric absorption.

Figs. 10 and 11 schematically show the arrangement of a slitless microphotometer according to the invention, intended for measuring the intensity of the coronal line around the sun:

A large metallic disc 121 is peripherally carried by three pulleys 122, 123 and 124 provided with grooves which maintain this disc and permit it to rotate about its center. The disc 121 is pierced with a circular concentric opening 120 in the center of which is placed concentrically a small metallic disc 126. The disc 126 is carried by a metal part 127 in which there is made a very small hole 128 on the edge and outside the disc 126. The objective lens of a refractor (not shown) forms, upon the disc 126, an image of the sun slightly larger in diameter. The light of the edge of this image falls, through 120, upon an opal glass ring 129, so as to permit checking and correcting, by a mere inspection, the centering of this image.

The light of the corona, mixed with that of the sky that falls upon the hole 128, is reflected twice by a prism 130 and proceeds therefrom along the axis of rotation 131 of the disc 121; it passes through a lens 132, the polarizing monochromatic filter 133—along its axis, a convergent lens 134, and inclined glass 135, the modulator 136, the polarizer 137, and penetrates in the photoelectric cell 138.

The light from the center of the sun is reflected by two small mirrors 140, $140^1$ and passes through a short, progressively obturatable, slit 141 whence it passes in proximity to the axis 131 and is weakened by reflection upon two small glass blades 142, 143 whence it passes obliquely through the lens 132, monochromatic filter 133, lens 134, polarizer 139 placed laterally of the axis 131, inclined glass 135, modulator 136, polarizer 137 and penetrates in the photo-electric cell 138.

Like in the preceding example the alternating current produced by the cell is collected by an amplifier (not shown), rectified by synchronous contacts and sent into the ironless armature winding of an electric motor (these three last parts are not shown). The motor regulates the opening of slit 141 by displacing about an axis 144 a movable edge 145 displaced by this motor with the aid of known means schematically indicated by the arrow 146 acting upon the lever 147 rotatable together with 145. The large disc 121 is covered with paper upon which a pointer 148, pivoted at 149, moves proportionally to the opening of the slit 141, under the joint action of the levers 147—148 interconnected by a rod 151 pivoted thereto as at 152, 153.

In the absence of coronal line, the solar lines of next wave-lengths that exist in the sky light, produce an alternating current which is nullified by imparting to the glass 135 a convenient inclination, independent from the brightness of the sky, and adjusted once for all.

A mechanism, schematically indicated at 154, rotates the drive shaft 155 of one of the rollers, 124, for example, thereby rotating the disc 121. The hole 128 successively receives the sky light at the same distance from the sun edge, in the various directions. If, in a certain direction, the coronal line is emitted, it produces an alternating current of a phase such that the slit 141 opens; the light that passes through the slit, polarized by the Polaroid 139, produces an alternating current more and more intensive; when the current nullifies the preceding one, the movable edge 145 of slit 141 stops and the pointer 148 indicates a value proportional to the intensity of the coronal line, as compared to that of the sun. Its position of equilibrium is independent from the transparency of the sky, as well as from its scattering power and the sensitiveness of the amplifier.

While the disc makes one revolution, the pointer 148, provided with a stylus as at 156, traces upon the paper a graph 157 that represents, in polar co-ordinates, the desired intensity, in the various directions.

A modified form of this apparatus consists in causing the slit 141 to be followed by a small interferometer for instance, of the type "Pérot & Fabry," of convenient thickness and to bring the light beam back along the axis of rotation, blended with the direct beam, by displacing the glass blade 143. It is then possible to remove the polarizer 139. The interferometer has for purpose to produce a channeled spectrum; its thickness is such that one of its dark bands coincides with the maximum of transmission of one of the components transmitted by the last filter layer, while its two adjacent bright bands coincide with the two maxima of transmission of the other component. It is not necessary to silver the two plates of the interferometer.

This application, more complicated than the preceding one, utilizes simultaneously two different modes of compensation.

(3) Application of the apparatus of the invention to measure the intensity of the coronal lines in front of the sun:

The presumed values of the intensities of these radiations before the sun are utilized, in France and in the United States, for ionospherical previsions; they are to be deducted from observations made on the east or on the west side, supposing that their intensities remain constant during at least a quarter of a revolution of the sun, that is, 7 days, which is often wrong. Direct measurements would be well preferable, but they appear to be extremely difficult, as the brightness of the two strongest lines must not exceed, at any point, a few hundred-thousandths of that of the continuous spectrum upon which they project themselves. It must, however, be possible to realize these measurements by means of the spectrophotometer according to the present invention.

The amplitude of the relative fluctuations of the electron-current varies, in fact, inversely with the square root of the flux received by the cell. Let us form the image of the sun upon the hole of the preceding apparatus (Figs. 10 and 12) with, for example, a refractor having a useful opening of 10 square decimeters, that is, a diameter of 36 centimeters; the luminous flux is multiplied by $10^4$ and relative fluctuations of the photo-electric current are 100 times smaller, that is $4 \cdot 10^{-6}$. The regions where the coronal lines is intensive will therefore produce a sensitive effect in one second and measurable if the amount of electricity furnished by the rectified current is totalized for a much longer time.

The use of the green line 5303 offers great difficulties owing to the presence of pretty strong solar lines, of similar wave-lengths, for these lines have wave-lengths and intensities slightly varying from one point to the other of the solar disc. The red line 6374 is, on the contrary, in a region of the solar spectrum taken up by lines particularly weak, which is a very favourable circumstance. In contrast, it is less strong than the green line and the cells are less sensitive to this wave-length; consequently, the measurements would necessitate a larger instrument, such as a telescope 1-meter in diameter.

(4) Application of the apparatus of the invention to study motions of the solar atmosphere:

The spectrophotometer without slit may advantageously replace the spectroscope, for studying motions of the solar atmosphere in the direction of the line of sight, for example the rotation of the sun at the various latitudes, motions of vapours moving towards or away from the spots, dissymmetrical enlargement of the lines near the edge of the sun, the Einstein effect, etc.

With the filter transmitting a band of 3 Angstrom in the red, the line $H\alpha$ whose width is 1 Angstrom, produces a modulation of the luminous flux which is maximum and averaging 40% when it is in the middle of the band transmitted; when this band is displaced by varying the temperature, the modulation decreases approximately according to the sine law and is nullified for a displacement of 1.5 Angstrom. With a constant temperature, a variation in wave-length of 0.5 Angstrom would produce a modulation of 20%. Owing to the importance of the luminous flux available on the sun it should be possible to detect modulations of some millionths and variations in wave-length of one hundred-thousandth of an Angstrom. On lines of mean intensity, of 0.1-Angstrom width, a ten-thousandth of Angstrom, would be detected while the sensitiveness of the best spectroscopes is limited to a few thousandths.

The displacement of the transmitted bands, in function of temperature, is, for quartz, in the order of half an Angstrom per degree centigrade; it should be necessary to maintain the filter temperature constant at least within a ten-thousandth of a degree. This difficulty may be attenuated, on one hand, by increasing the sensitiveness of the thermostat and, on the other hand, by making differential measurements and by operating rapidly. It is advantageous to carry out the measurements by nullifying the photo-electric current with the aforesaid compensator.

(5) Application of the apparatus of the invention for measuring magnetic fields in the sun:

Just as for the radial velocities, the sensitiveness of the slitless spectrophotometer must be much greater than that of the spectrograph. It must allow us to study not only the magnetic field of the spots, but also the general magnetic field of the sun, whose existence has not yet been proved and whose evidence would be of great importance. This field, presumably of 50 Gauss, must produce splittings of a few ten-thousandths of an Angstrom and up to one thousandth for certain lines. This field becomes easily measurable with the slitless spectrophotometer of the invention.

(6) Application of the apparatus of the invention to measure the intensity of the lines of the night sky:

These lines are thin and extremely weak. For example, the green radiation 5577 is only 1 or 2 tenths of the light of a moonless sky. Its intensity, varying from one point to the other of the sky, depends upon the solar activity and it is strengthened in the polar aurorae. Its study is of great importance for geophysics.

The best recorders of the intensity of this radiation are constituted by a photo-electric cell provided with a colour filter that isolates a wide region of the spectrum in which this line is included. These apparatus have the inconvenience of being sensitive to the continuous sky spectrum; their use necessitates the absence of moonlight and of any light in the neighbourhood.

The slitless spectrophotometer allows to measure the intensity of the green line without being hindered, even by the full moon, at twilight and even in day time.

In deed, the brightness of the diurnal sky, for from the sun, is a few tenths of a candle per square centimeter and may be diminished for less than one tenth by a polarizer. The brightness of the green line is in the order of $3 \cdot 10^{-9}$ candles per cm.$^2$. Through a filter transmitting a band of 8 Angstrom with a transparency of 10%, the sky light will be reduced to $10^{-4}$ candles, that of the line to $3 \cdot 10^{-10}$; the modulation will therefore be $3 \cdot 10^{-6}$. With a filter having a very large field (¼ of steradian) and a 10 cm.$^2$-opening, the flux received will be $2.5 \cdot 10^{-4}$ lumens, yielding $1.6 \cdot 10^{10}$ electrons per second. It would be possible to detect, in one second, a modulation of $0.8 \cdot 10^{-5}$, and the effect of the green line would be sensitive in 10 seconds and measurable in a much longer time. These measurements would be greatly facilitated by a reinforcement of the radiation probably very important in day-time. The polar aurorae may be recorded in broad daylight. The same method would be applicable to the other lines of the night sky, mainly to the red line 6,300 and to the D lines of sodium which manifest a very important strengthening at twilight. The solar lines will produce a constant effect that may be compensated. Telluric lines, being variable, are much more dangerous.

(7) Application of the apparatus of the invention to measure the intensity of telluric bands:

The same arrangements may be applied to telluric bands with a filter transmitting a band sufficiently wide. They will allow us to make a record similar to that of the line Hα, yielding, at any instant, the amount of water vapours contained either in all the atmosphere, if the apparatus is pointed onto the sun or onto the moon, or in the determined path if the apparatus is pointed onto a terrestrial source of light with a continuous spectrum.

(8) Application of the apparatus of the invention to the metallography:

The same methods allow to measure directly the intensity ratio of two spectral lines due to two components of an alloy and to deduce therefrom the composition of this alloy. There will be selected the filter composition and the filter layer to be placed as the last one in order to transmit two rectangular polarized bands coinciding each one with one of the lines to be compared. The apparatus has great advantages over the spectrographs, owing to its accuracy and luminosity: transmitting the totality of the source light; a flame, an electric arc or an electric spark, the results are unaffected by oscillations of this source and by local inequalities of the source brightness.

What is claimed is:

1. A slitless spectrophotometer adapted to be positioned in the path of a beam of light emitted by the source of light to be examined and concentrated by conventional means which comprises, filtering means adapted to transmit a narrow chromatic band, polarizing means, fixed birefringent means adapted to transmit two complementary channeled spectra polarized in two rectangular directions, compensating means for modifying the intensity ratio of the two spectra, modulating means followed by polarizing means for alternately transmitting one of these spectra to a photo-electric cell while interrupting the other of said spectra, means for adding and amplifying the alternating currents produced, means for rectifying said currents, and receiving means for the rectified currents, wherein said currents are employed for the purpose of reading and actuating the said compensating means until said current is nullified.

2. A slitless spectrophotometer as defined in claim 1, wherein the filtering means comprises a polarizing monochromatic filter.

3. A slitless spectrophotometer as defined in claim 1, wherein the modulating means precedes the filtering means.

4. A spectrophotometer as defined in claim 1, further comprising at least one orientably inclined glass element adapted for partially polarizing the light prior to the modulating means, the changes in inclination of said glass element being utilized for translating and measuring the corresponding changes in wave length of the line analyzed in the light received and photo-electric cells and detection means and amplification means for receiving the luminous flux transmitted by the inclined glass element, whereby to produce two currents corresponding to the rectangular components of the polarized light analyzed, an inscribing device and an electric motor for displacing said inscribing device, said electric motor being adapted to operate in response to angular displacements of said inclined element, said motor being set in operation by variations in the intensity of the light and being stopped when the differences between the two currents issuing from the assembly of cells is nullified.

5. A spectrophotometer as defined in claim 1, further comprising photo-electric cells and detection means and amplification means for receiving the luminous flux transmitted, whereby to produce two currents corresponding to the rectangular components of the polarized light analyzed, means defining a slit for the rays emitted from the light source, movable screen means for varying the size of said slit, an electric motor for displacing said screen means, said electric motor being adapted to operate in response to the current in said photo-electric cells, and inscribing means including a pointer, said pointer being actuated by the movements of said screen.

6. Apparatus as defined in claim 1, in which said polarizing and birefringent means only partially polarize the light passing through them and in which said compensating means comprises an orientably inclined glass element having an adjustable inverse polarizing effect which permits complete compensation of the preceding polarization of the light.

7. Apparatus as defined in claim 1 wherein said modulating means are constituted by a glass body having its opposed bases subjected to a periodical compression adjustable by means of a cam-operated leverage, substantially as described.

8. Apparatus as defined in claim 1 wherein said modulating means are constituted by a rotatable disc having its halves made of quartz of thicknesses so adjusted as to cause the incident vibrations to rotate alternately through 45° in opposite directions, substantially as described.

9. Apparatus as defined in claim 1 wherein said modulating means are constituted by two superposed transparent half-wave discs, substantially as described.

10. Apparatus as defined in claim 1 wherein the polarizing means are made of Iceland spar to divide the incident light into two beams polarized in two rectangular directions and impinging on two photo-electric cells so as to thereby produce opposed alternating currents.

References Cited in the file of this patent

UNITED STATES PATENTS

| | | |
|---|---|---|
| 1,954,947 | Pajes | Apr. 17, 1934 |
| 2,059,786 | Gilbert | Nov. 3, 1936 |
| 2,166,824 | Runaldue | July 18, 1939 |
| 2,383,075 | Pineo | Aug. 21, 1945 |
| 2,438,422 | Stearns et al. | Mar. 23, 1948 |
| 2,439,373 | Stearns | Apr. 6, 1948 |
| 2,450,761 | MacNeille | Oct. 5, 1948 |
| 2,527,593 | Stadler | Oct. 31, 1950 |

FOREIGN PATENTS

| | | |
|---|---|---|
| 438,511 | Great Britain | Nov. 19, 1935 |

OTHER REFERENCES

Billings: "A Tunable Narrow-Band Optical Filter," Journal Optical Society of America, vol. 37, pages 738–746, October 1947.